(12) United States Patent
Yuan et al.

(10) Patent No.: US 6,942,153 B1
(45) Date of Patent: Sep. 13, 2005

(54) HANDHELD COMPUTER

(75) Inventors: Chien Shen Yuan, Hsin-Tien (TW); Chen Chun Hsien, Hsin-Tien (TW)

(73) Assignee: Unitech Electronics Co., Inc., Taipei Hsien (TW)

( * ) Notice: Subject to any disclaimer, the term of this patent is extended or adjusted under 35 U.S.C. 154(b) by 0 days.

(21) Appl. No.: 10/852,473

(22) Filed: May 25, 2004

(51) Int. Cl.[7] ............................. G06K 7/10; G06K 7/00
(52) U.S. Cl. ................ 235/472.01; 235/380; 235/435; 235/486; 235/487; 235/462.43; 361/683
(58) Field of Search ................ 235/472.01, 462.45, 235/462.43, 435, 380, 487, 486–87; 361/681, 361/683, 686, 728, 736–37, 752; 177/254, 177/260, 261; 174/66, 67; 220/241; 206/320, 206/811, 307; 455/347, 575.1, 575.8

(56) References Cited

U.S. PATENT DOCUMENTS

| | | | | |
|---|---|---|---|---|
| 5,315,489 A | * | 5/1994 | McCall et al. ............... 361/801 |
| 5,430,607 A | * | 7/1995 | Smith .......................... 361/683 |
| 5,532,466 A | * | 7/1996 | Konno et al. ................ 235/441 |
| 5,574,625 A | * | 11/1996 | Ohgami et al. .............. 361/684 |
| 5,617,343 A | * | 4/1997 | Danielson et al. .......... 709/245 |
| 5,661,634 A | * | 8/1997 | Obata et al. ................ 361/684 |
| 5,680,633 A | * | 10/1997 | Koenck et al. ........ 235/472.02 |
| 5,712,763 A | * | 1/1998 | Bullister ...................... 361/686 |
| 5,774,331 A | * | 6/1998 | Sach ........................... 361/683 |
| 5,805,416 A | * | 9/1998 | Friend et al. ................ 361/686 |
| 5,847,698 A | * | 12/1998 | Reavey et al. ............... 345/173 |
| 5,877,488 A | * | 3/1999 | Klatt et al. .................. 235/486 |
| 5,933,328 A | * | 8/1999 | Wallace et al. ............. 361/737 |
| 5,980,276 A | * | 11/1999 | Arita et al. .................. 439/131 |
| 6,016,954 A | * | 1/2000 | Abe et al. .................... 235/379 |
| 6,062,887 A | * | 5/2000 | Schuster et al. ............. 439/218 |
| 6,097,606 A | * | 8/2000 | Groves et al. ............... 361/747 |
| 6,230,885 B1 | * | 5/2001 | Rochelo et al. ........... 206/308.3 |
| 6,266,685 B1 | * | 7/2001 | Danielson et al. .......... 708/141 |
| 6,282,086 B1 | * | 8/2001 | Loh et al. .................... 361/684 |
| 6,407,911 B1 | * | 6/2002 | Spence et al. ............... 361/683 |
| 6,424,118 B1 | * | 7/2002 | Tu ............................... 320/115 |
| 6,453,281 B1 | * | 9/2002 | Walters et al. .............. 704/200 |
| 6,454,581 B1 | * | 9/2002 | Ribeiro ....................... 439/148 |
| 6,488,425 B1 | * | 12/2002 | Spence et al. ............... 400/714 |
| 6,497,368 B1 | * | 12/2002 | Friend et al. ........... 235/472.01 |
| 6,633,483 B2 | * | 10/2003 | Akagi et al. ................. 361/686 |
| 6,651,881 B1 | * | 11/2003 | Choiset ....................... 235/380 |
| 6,724,618 B1 | * | 4/2004 | Jenkins et al. .............. 361/684 |
| 6,766,952 B2 | * | 7/2004 | Luu ............................. 235/451 |
| 6,768,896 B2 | * | 7/2004 | Tjalldin et al. ............. 455/11.1 |
| 6,837,435 B2 | * | 1/2005 | Kehoe et al. ........... 235/472.01 |
| 6,852,929 B2 | * | 2/2005 | Scudder ....................... 174/66 |
| 2001/0030856 A1 | * | 10/2001 | Wilson ........................ 361/814 |
| 2002/0037741 A1 | * | 3/2002 | Tjalldin et al. ............. 455/552 |

(Continued)

FOREIGN PATENT DOCUMENTS

JP         20011444595      *  5/2004

Primary Examiner—Karl D. Frech
Assistant Examiner—Daniel Walsh

(57) ABSTRACT

A palm handheld computer has a host, an enclosure and a water proof structure. The host has at least two connection slots allowing various types of function cards to be plugged. The host is housed within the enclosure. The enclosure includes a front panel and a rear panel, and the water proof structure is disposed between the front and rear panels to provide water proof. Thereby, function cards with various specifications can be applied to the host to expand access capacity of the handheld computer. Further, the water proof mechanism allows the handheld computer to be used outdoors or in a humid environment.

8 Claims, 6 Drawing Sheets

U.S. PATENT DOCUMENTS

| | | |
|---|---|---|
| 2003/0002277 A1 * | 1/2003 | Lu .............................. 362/109 |
| 2003/0023397 A1 * | 1/2003 | Parlor et al. ................ 702/127 |
| 2003/0048605 A1 * | 3/2003 | Kyozuka et al. ............ 361/686 |
| 2003/0062275 A1 * | 4/2003 | Rochelo ................. 206/308.3 |
| 2003/0095194 A1 * | 5/2003 | Suzuki et al. .......... 348/231.99 |
| 2003/0121981 A1 * | 7/2003 | Slutsky et al. ......... 235/462.45 |
| 2003/0142273 A1 * | 7/2003 | Togashi et al. ............. 352/166 |
| 2003/0163624 A1 * | 8/2003 | Matsui et al. ................ 710/301 |
| 2003/0222149 A1 * | 12/2003 | Solomon et al. ....... 235/472.01 |
| 2003/0227805 A1 * | 12/2003 | Saito et al. .................. 365/200 |
| 2004/0014497 A1 * | 1/2004 | Tjalldin et al. .............. 455/558 |
| 2004/0089570 A1 * | 5/2004 | Chien et al. ................ 206/320 |
| 2004/0179124 A1 * | 9/2004 | Morimoto et al. ...... 348/333.02 |

* cited by examiner

HANDHELD COMPUTER

BACKGROUND OF THE INVENTION

The present invention relates in general to a handheld computer, and more particularly, to a handheld computer which incorporates a waterproof structure to facilitate outdoor application or application in a humid environment.

Handheld computers include personal data assistant (PDA), barcode scanners and data collectors that have been used in our daily lives. For example, barcodes have been commonly used as a window of inventory or shipment management in stores, shops, markets or companies. They are also used as identifications for parking ticket, credit statement or other types of bills.

However, the conventional barcode scanners do not include expansion slots. When the amount of products or goods increases, or when a mobile operation is required for shipment or transportation, the practicability of the barcode scanners is restricted. Therefore, external connection slots have been developed to connect the barcode scanners by adapters. The adapter provides connection of a function card to the barcode scanner. However, the adapter is not suitable for use in outdoors because the housing thereof is permeable to dust and moisture to cause short circuit easily.

To resolve the problems caused by the conventional barcode scanners as described above, the Applicant, with many years of experience in this field, has developed a handheld computer as described as follows.

BRIEF SUMMARY OF THE INVENTION

The present invention provides an improved handheld computer including two connection slots installed in a host thereof, such that function cards with different specifications can be plugged in the handheld computer simultaneous to expand access capability thereof.

The present invention further provides an improved handheld computer includes a water proof structure on and between various devices thereof, such that the handheld computer of the present invention can be used outdoors or in a humid environment.

The handheld computer provided by the present invention includes a host, an enclosure and a waterproof structure. The host includes at least two connection slots allowing various types of function cards to be plugged in. The host is housed by the enclosure which includes a front panel and a rear panel. The waterproof structure is applied between the front panel and the rear panel.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

These, as well as other features of the present invention, will become apparent upon reference to the drawings wherein.

DETAILED DESCRIPTION OF THE INVENTION

Figure 1:
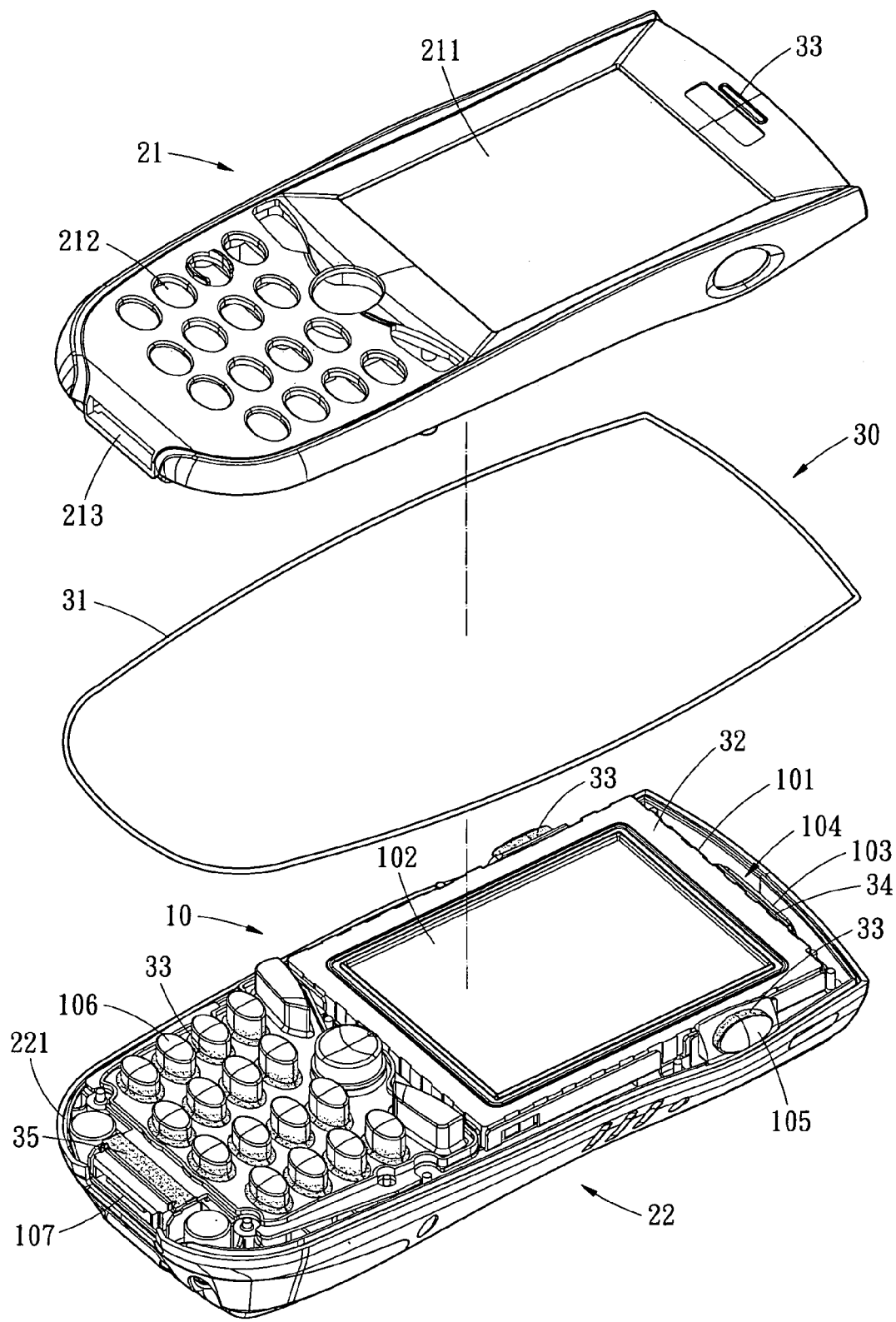
FIG. 1 shows an exploded front view of a handheld computer.

Referring now to the drawings wherein the showings are for purpose of illustrating preferred embodiments of the present invention only, and not for purposes of limiting the same. FIG. 1 shows an exploded front view of a handheld computer provided by the present invention. In the embodiment, a barcode scanner is exemplarily illustrated. As shown, the barcode scanner includes a host 10, an enclosure 20 and a waterproof structure 30.

Preferably but optionally, the host 10 includes a rectangular body 101 and a display screen 102 formed on a top surface of the rectangular body. The rectangular body 101 further includes a display light 103 and a scanner unit 104 over the display screen 102. Switches 105 are formed at either side of the rectangular body 101, and functional keys 106 are formed under the display screen 102. A connection port 107 is formed under the function keys 106.

Figure 2:
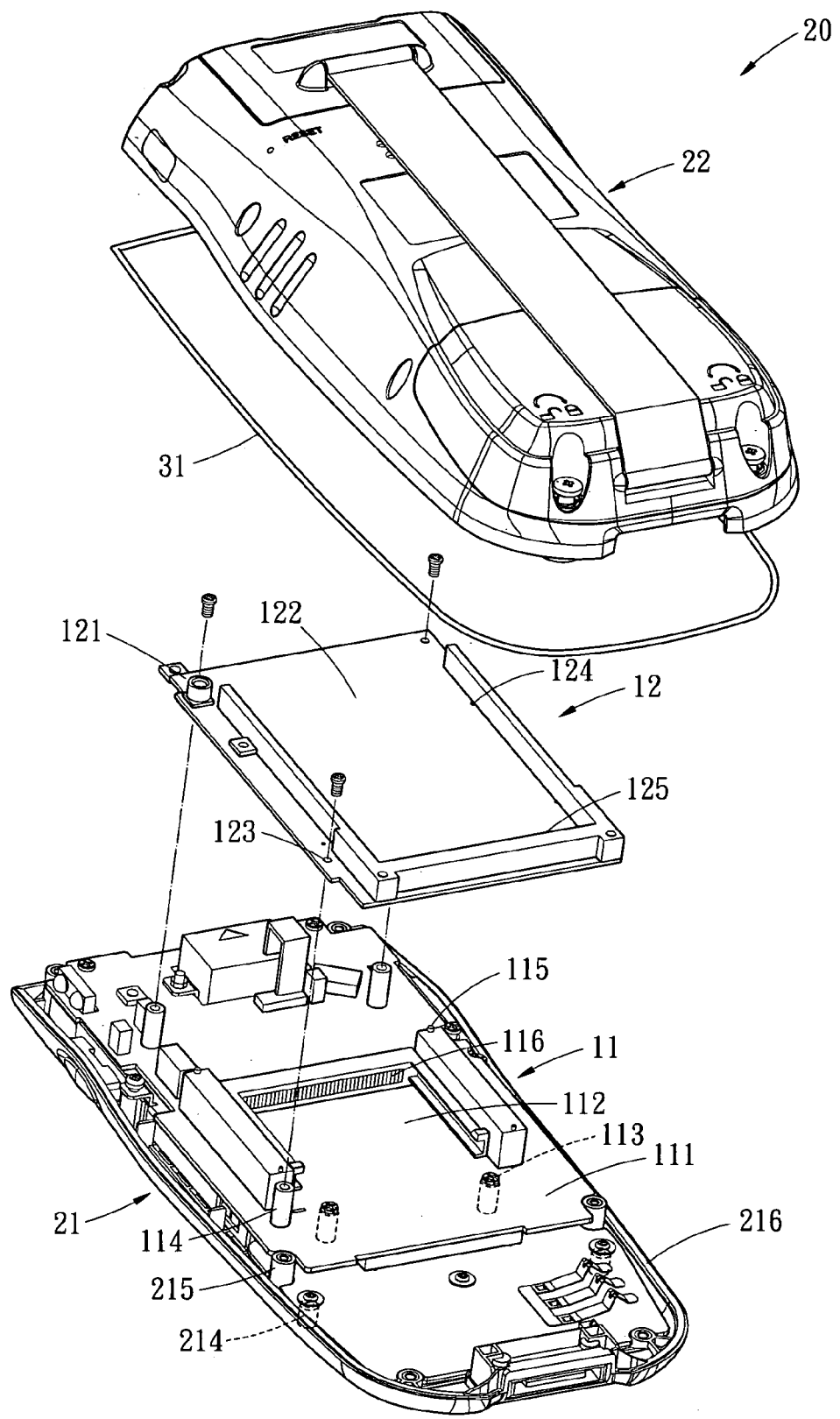
FIG. 2 shows an exploded rear view of the handheld computer.
Figure 3:
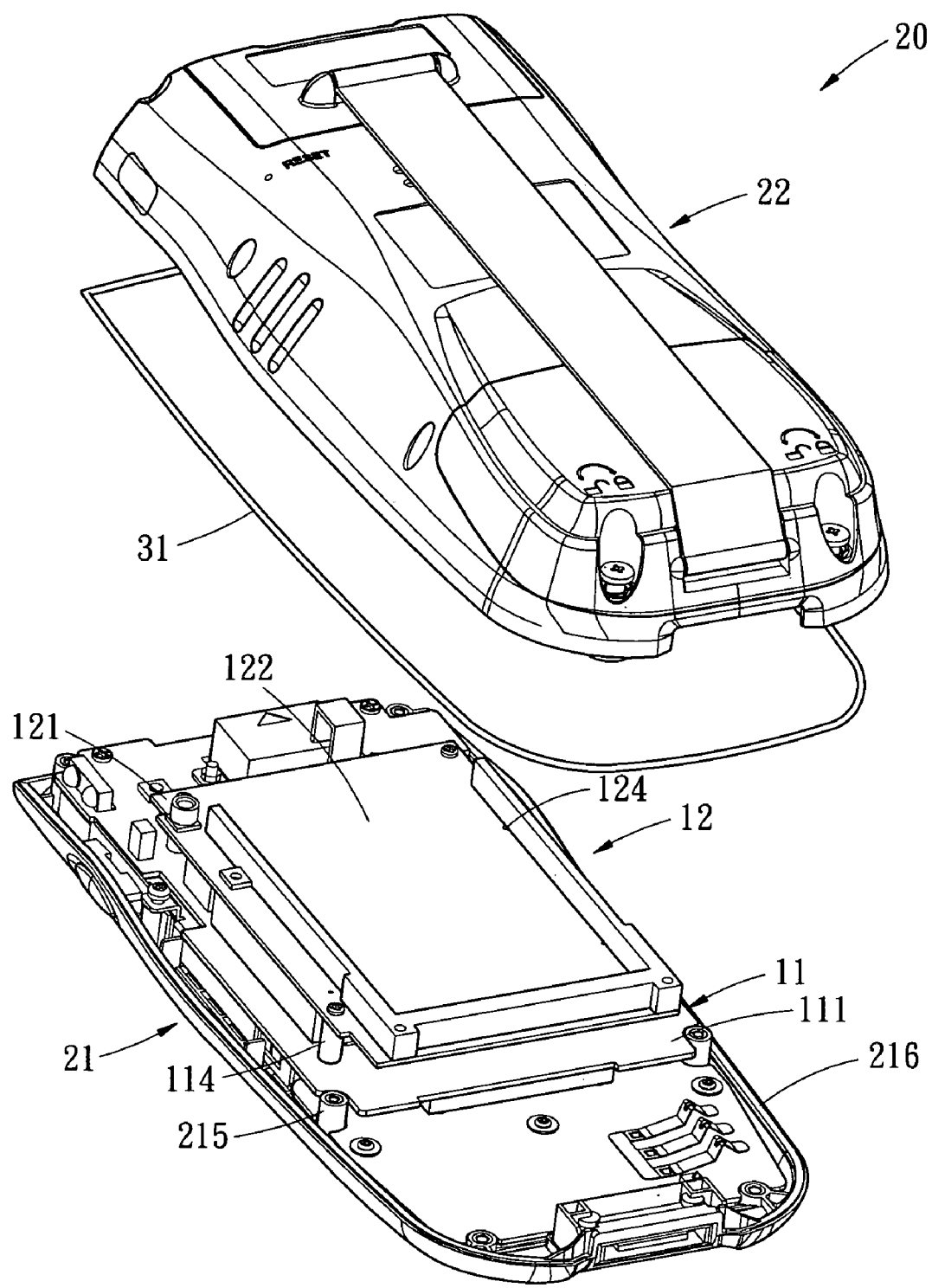
FIG. 3 shows the connection of the front panel and the rear panel.
Figure 4:
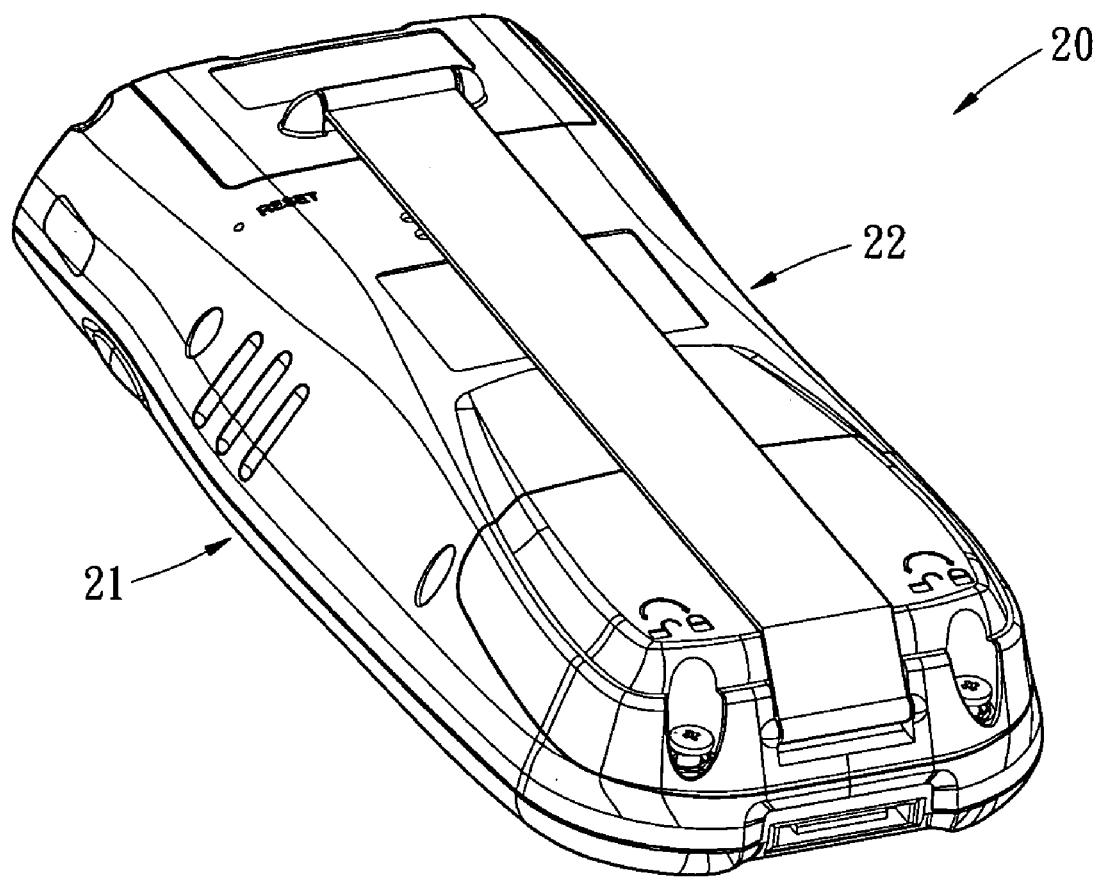
FIG. 4 shows a perspective rear view of the handheld computer.

As shown in FIGS. 2–4, a first connector 11 is mounted to the host 10. The first connector 11 includes a first printed circuit board 111 and a first slot 112. A plurality of holes 113 is formed through the first printed circuit board 111 and a plurality of columns 114 with threaded internal surfaces is formed on the first printed circuit board 111. The first printed circuit board 111 can thus attached to the host 10 using a plurality of fasteners such as screws threaded through the holes 113. As shown in FIG. 2, the first slot 112 is in the form of a rectangular frame with one open end. Positioning columns 115 are formed on the frame of the first slot 112, and a socket of terminals 116 is formed on one internal side of the frame, preferably the internal side facing the open end.

A second connector 12 is mounted over the first connector 11. Similarly, the second connector 12 includes a second printed circuit board 121 and a second slot 122. Through holes 123 are formed through the edge of the second printed circuit board 121, such that the second connector 12 can be secured to the first connector 11 using screws threaded through the through holes 123 to be engaged with the columns 114. Similarly, the second slot 122 of the second connector 12 includes a rectangular frame with one open end allowing various types of functional cards to be plugged in. The frame includes a socket of terminals 125 formed on one internal side thereof. Preferably, the internal side having the socket of terminals 125 faces opposite to the open end.

The enclosure 20 includes a front panel 21 and a rear panel 22 to be engaged with each other. The front panel 21 includes a slot 211, through holes 212 and an opening 213 (as shown in FIG. 1) to expose the display screen 102, the functional keys 105, and the connection port 213, respectively. The front panel 21 includes a first threaded column 214 and a second threaded column 215 for mounting the host 10 and the second panel 22 using fasteners such as screws. As shown, the periphery of the front panel 21 is conformal to the periphery of the rear panel 22. The front panel 21 includes a protruding periphery 216, while the rear panel 21 includes a recessed periphery 221 allowing the protruding periphery 216 of the front panel 21 engaged therein.

Figure 5:
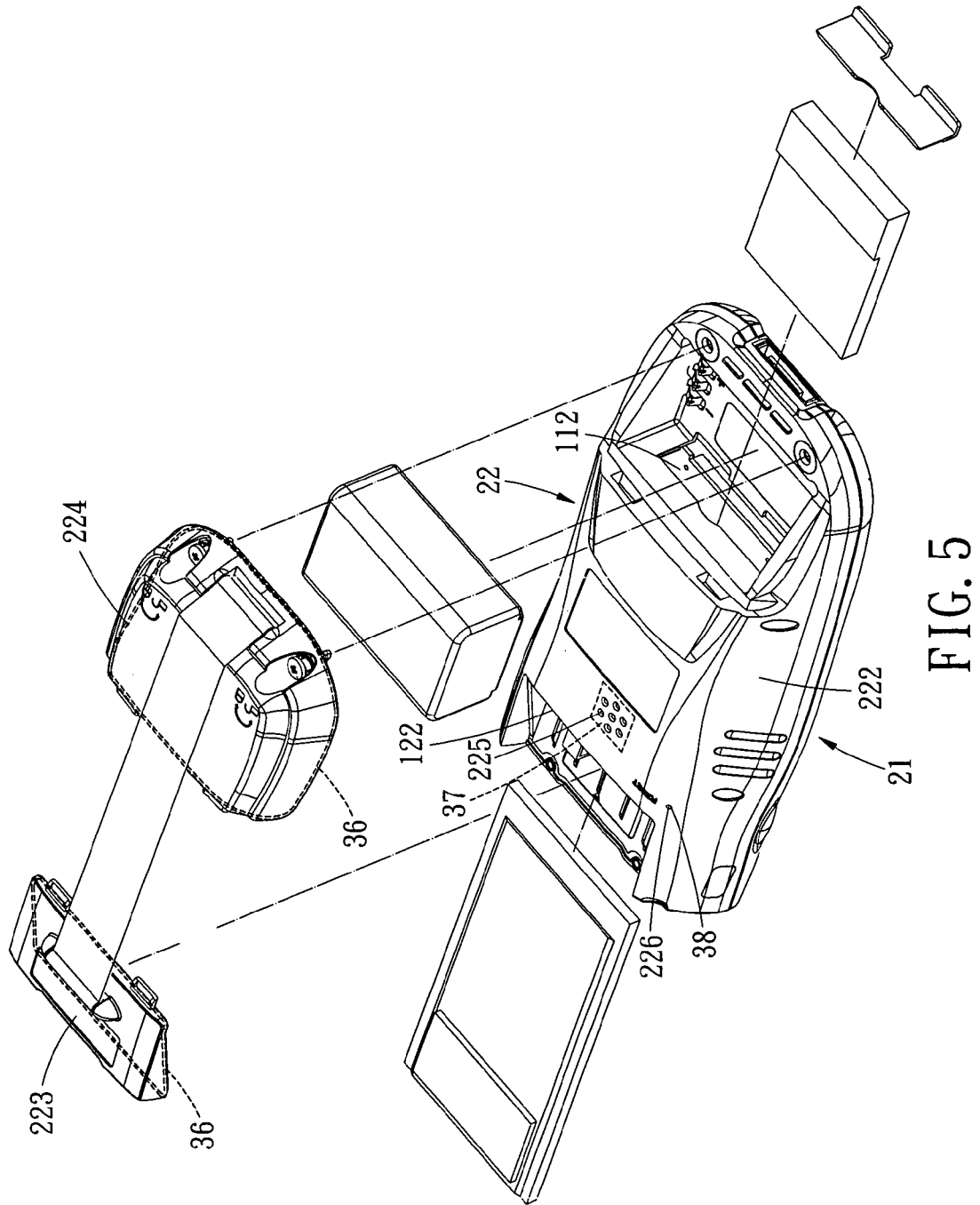
FIG. 5 shows the operation status of a function card.
Figure 6:
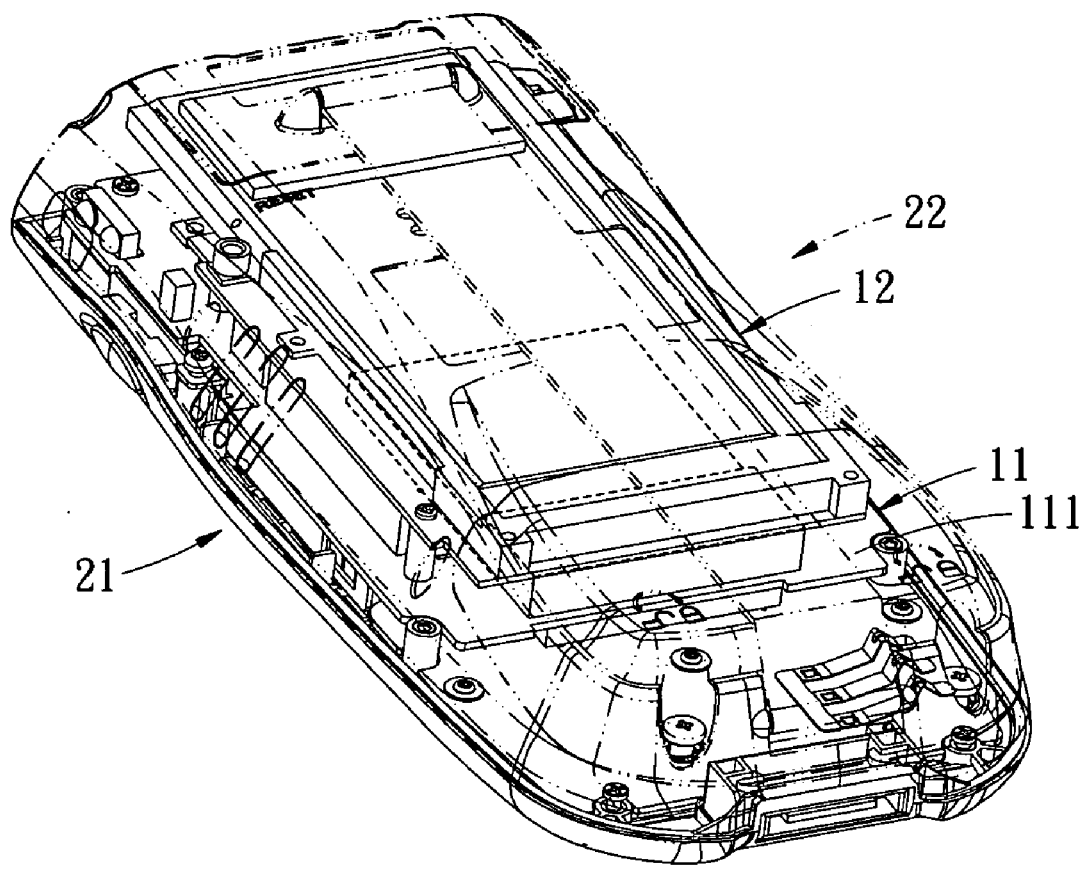
FIG. 6 shows another operation status of the function card.

As shown in FIGS. 5 and 6, application of functional cards to the handheld computer is illustrated. The rear panel includes a cover 222 fixed with the front panel 21, a removable top lid 223 and a removable bottom lid 224. The removable top and bottom lids 223 and 224 are fitted with two opposing ends of the cover 222 using screws. When the screws are released, the top lid 223 and the bottom lid 224 can be removed from the cover 222 to expose the first slot 112 and the second slot 122. In this embodiment, the first and second slots 112 and 122 are so oriented that the open ends thereof are exposed in different ends of the cover 222. The sockets of terminals 116 and 125 allows various types of functional cards to be plugged in, including PCMCIA card, SIM card, SD card or CF card, for example. In this embodiment, a CF card is plugged in the first slot 112, and a PCMCIA card is plugged in the second slot 122 to expand access capacity of the handheld computer. According to specific requirement, speaker holes 225 are formed through the cover 222 of the rear panel 22.

Referring to FIGS. 1 and 5, the waterproof structure 30 is inserted into the recessed periphery 221 of the rear panel 22 to serve as a rubber element between the front panel 21 and the rear panel 22. Preferably, silicon rubber 32 is installed along the slot 211 between the bottom surface of the front panel 21 and the display screen 102. Waterproof tapes 33 are applied around the display light 103, the switch 105 and functional keys 106. In addition, waterproof tape 34 is applied between the scanning unit 104 and the rear panel 21. A plastic frame 35 is mounted around the connection port 107 between the front and rear panels 21 and 22. Lid rubber 36 is formed between the cover 22 and the top and bottom lids 223 and 224. A piece of non-woven cloth 37 and a waterproof cover 38 are disposed over the speaker holes 225 and the positioning holes 226. Therefore, a reliable waterproof mechanism is installed to prevent water from entering the handheld computer.

Accordingly, the present invention includes at least the following advantages.

1. By the design of connector slots, the access capacity of the handheld computer is expanded to enhance efficiency of automatic operation and reduce the cost.

2. By installing the connector slots inside of the enclosure, signal interruption caused by external impact of the function cards can be avoided.

This disclosure provides exemplary embodiments of the present invention. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A handheld computer, comprising:
    an enclosure, having a front panel and a rear panel, wherein the rear panel has a cover and a top lid and a bottom lid fitted to two opposing ends of the cover;
    a host, having at least two connector slots allowing various types of functional cards to be plugged therein, the host is installed in the enclosure; and
    a waterproof mechanism, comprising:
        a first rubber element embedded between peripheries of the front and rear panels;
        a second rubber element and a waterproof tape applied between the host and the front panel;
        a top-surface tape applied between the host and the rear panel;
        a plastic frame disposed between the front, rear panels and the host; and
        a lid rubber, a piece of non-woven cloth and a waterproof cover on an internal surface of the rear panel.

2. The handheld computer of claim 1, including a barcode scanner.

3. The handheld computer of claim 1, further comprising a first connector and a second connector each including a printed circuit board and one of the connector slots.

4. The handheld computer of claim 3, wherein one of the connector slots includes a CF card slot.

5. The handheld computer of claim 3, wherein one of the connector slots includes a PCMCIA card slot.

6. The handheld computer of claim 3, wherein one of the connector slots includes at least one positioning column, and the other of the connector slots includes a positioning hole extending therethrough for engaging with the positioning column.

7. The handheld computer of claim 1, wherein the front panel includes a first threaded hole and a second threaded hole extending from an internal surface thereof, the first threaded hole provides fastening mechanism to the host, and the second threaded hole provides fastening mechanism to the rear panel.

8. The handheld computer of claim 1, wherein the rear panel includes a recessed periphery for embedding the first rubber element therein, and the front panel includes a protruding periphery to be engaged within the recessed periphery of the rear panel.

* * * * *